United States Patent
Makizoe et al.

(10) Patent No.: US 12,422,021 B2
(45) Date of Patent: Sep. 23, 2025

(54) POWER TRANSMISSION PIN FOR SPEED CHANGER, SPEED CHANGER AND METHOD OF MANUFACTURING POWER TRANSMISSION PIN FOR SPEED CHANGER

(71) Applicant: Nabtesco Corporation, Tokyo (JP)

(72) Inventors: Yoshiaki Makizoe, Tokyo (JP); Kazuyoshi Makisumi, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/784,063

(22) Filed: Jul. 25, 2024

(65) Prior Publication Data

US 2025/0052300 A1    Feb. 13, 2025

(30) Foreign Application Priority Data

Aug. 8, 2023    (JP) .................. 2023-129120

(51) Int. Cl.
*F16H 1/32*    (2006.01)
*C23C 8/26*    (2006.01)

(52) U.S. Cl.
CPC .............. *F16H 1/32* (2013.01); *C23C 8/26* (2013.01); *F16H 2001/325* (2013.01)

(58) Field of Classification Search
CPC ... F16H 1/32; F16H 1/325; C23C 8/26; C23C 8/24
See application file for complete search history.

(56) References Cited

U.S. PATENT DOCUMENTS

| | | | | |
|---|---|---|---|---|
| 1,748,378 A | * | 2/1930 | Armstrong | C23C 8/26 30/350 |
| 1,853,562 A | * | 4/1932 | Herr | C23C 8/26 92/144 |
| 6,132,135 A | * | 10/2000 | Gerber | C23C 8/26 464/902 |

FOREIGN PATENT DOCUMENTS

| CN | 104565216 A | * | 4/2015 | ............. B25J 17/00 |
| EP | 3369965 A1 | * | 9/2018 | ......... F16H 57/0434 |
| EP | 4198340 A1 | | 6/2023 | |
| JP | 06-028394 U | | 4/1994 | |
| JP | 2017-082993 A | | 5/2017 | |
| JP | 2020094652 A | * | 6/2020 | ............... F16C 3/18 |
| JP | 2023-088876 A | | 6/2023 | |
| WO | WO-2015046086 A1 | * | 4/2015 | .............. B60K 7/00 |
| WO | WO-2023143855 A1 | * | 8/2023 | ......... F16C 11/0604 |

OTHER PUBLICATIONS

Extended European Search Report dated Dec. 12, 2024, issued in corresponding European Patent Application No. 24191156.9 (10 pgs.).

* cited by examiner

*Primary Examiner* — Sherry L Estremsky
(74) *Attorney, Agent, or Firm* — Pillsbury Winthrop Shaw Pittman, LLP

(57) ABSTRACT

A power transmission pin relating to the present disclosure includes a shaft portion and an externally threaded portion configured to fixedly attach the shaft portion onto a speed changing mechanism, the externally threaded portion being formed on an end of the shaft portion in an axial direction, the externally threaded portion and the shaft portion being coaxially arranged. At least a surface of the shaft portion has higher hardness than the externally threaded portion.

10 Claims, 2 Drawing Sheets

POWER TRANSMISSION PIN FOR SPEED CHANGER, SPEED CHANGER AND METHOD OF MANUFACTURING POWER TRANSMISSION PIN FOR SPEED CHANGER

CROSS-REFERENCE TO RELATED APPLICATIONS

This application is based on and claims the benefit of priority from Japanese Patent Application Serial No. 2023-129120 (filed on Aug. 8, 2023), the contents of which are hereby incorporated by reference in their entirety.

TECHNICAL FIELD

The present disclosure relates to a power transmission pin for a speed changer, a speed changer, and a method of manufacturing a power transmission pin for a speed changer.

BACKGROUND

Known rotating mechanisms include speed changers provided with input and output parts. For example, rotation is input from an electric motor or the like into the input part, the input rotation is reduced or increased, and the reduced or increased rotation is output through the output part. Known speed changers include eccentric oscillation speed reducers that has high load capacity and high accuracy in rotational position. This type of speed reducer includes: for example, a case (frame) having an internal gear formed on its inner circumferential surface; an oscillating gear (external gear) meshed with the internal gear and configured to oscillatorily rotate; a crankshaft (input rotator) having an eccentric portion rotatably supporting the oscillating gear and being configured to transmit a rotational force to the oscillating gear, a power transmission pin (carrier pin) configured to receive a rotational force transmitted from the oscillating gear, and a carrier (output rotator) connected to the power transmission pin.

The oscillating gear has a pin insertion hole through which the power transmission pin is inserted. The carrier has a pin insertion hole into which the power transmission pin is inserted or pushed. As the power transmission pin is inserted into these pin insertion holes, the rotation of the oscillating gear can be transmitted to the carrier via the power transmission pin. The pin insertion hole of the oscillating gear is sized such that it can allow the oscillating gear to oscillate relative to the power transmission pin. The pin insertion hole of the oscillating gear has a cylindrical bushing inserted. The power transmission pin is inserted through the bushing.

The power transmission pin may slip out of the carrier as it moves in a certain direction. The power transmission pin is restricted from moving in this direction by, for example, having an externally threaded portion at its tip and a nut tightened onto the externally threaded portion. The externally threaded portion of the power transmission pin protrudes outside in the axial direction through the pin insertion hole of the carrier. As the nut is tightened onto the protruding externally threaded portion, the power transmission pin is restricted from moving relative to the carrier in the direction (see, for example, Japanese Patent Application Publication No. 2017-82993).

Referring to the above-described conventional art, the power transmission pin plays a role of transmitting the rotational force of the oscillating gear to the carrier. This means that the power transmission pin may be heavily loaded. The power transmission pin is thus required to have improved strength and toughness. The power transmission pin is also required to have improved wear resistance since it is designed to slide relative to the bushing. The power transmission pin is accordingly required to have improved wear resistance in addition to improved strength and toughness. In this regard, conventional power transmission pins have room for improvement.

SUMMARY

An objective of the present disclosure is to provide a power transmission pin for a speed changer, a speed changer, and a method of manufacturing a power transmission pin for a speed changer that are capable of achieving improved strength, toughness and wear resistance.

One aspect of the present disclosure provides a power transmission pin for a speed changer, the power transmission pin being used in a speed changer and configured to transmit power, the speed changer including a speed changing mechanism configured to receive rotation input thereto, change a speed of the rotation, and output the speed-changed rotation. The power transmission pin includes a shaft portion, and an externally threaded portion configured to fixedly attach the shaft portion onto the speed changing mechanism, the externally threaded portion being formed on an end of the shaft portion in an axial direction, the externally threaded portion and the shaft portion being coaxially arranged. At least a surface of the shaft portion has higher hardness than the externally threaded portion.

The anti-wear resistance, strength and toughness of the power transmission pin for a speed changer may be enhanced simply by raising the hardness of the entire power transmission pin for a speed changer. This attempt, however, may result in damaging the externally threaded portion of the power transmission pin for a speed changer. Considering this, the hardness of at least the surface of the shaft portion of the power transmission pin for a speed changer is higher than that of the externally threaded portion. In this way, the externally threaded portion is less likely to be damaged while the shaft portion, which may receive the highest load, can have sufficient strength. The power transmission pin can thus achieve improved strength, toughness and anti-wear resistance.

In the implementation, the surface of the shaft portion may be nitrided into a nitride layer.

A further aspect of the present disclosure provides a speed changer including: an input part configured to rotate; a speed changing mechanism configured to change a speed of rotation of the input part; and an output part configured to receive the rotation of the input part transmitted via the speed changing mechanism. The speed changing mechanism includes: a gear having a pin insertion hole; a power transmission pin inserted through the pin insertion hole; and a tubular bushing inserted through the pin insertion hole and fitted onto the power transmission pin. The power transmission pin includes: a shaft portion; and an externally threaded portion connecting the gear and the power transmission pin into a single piece, the externally threaded portion being formed on an end of the shaft portion in an axial direction, the externally threaded portion and the shaft portion being coaxially arranged. At least a surface of the shaft portion has higher hardness than the externally threaded portion and than the bushing.

In the speed changer, the anti-wear resistance of the shaft portion against the bushing can be certainly improved. The speed changer can thus achieve improved strength, toughness and anti-wear resistance.

In the implementation, the surface of the shaft portion may be nitrided into a nitride layer.

A yet another aspect of the present disclosure provides a method of manufacturing a power transmission pin for a speed changer, the power transmission pin being used in a speed changer and configured to transmit power, the speed changer including a speed changing mechanism configured to receive rotation input thereto, change a speed of the input rotation and output the speed-changed rotation. The method includes steps of: hardening a surface of a rod-shaped base material; subsequent to the hardening, removing the hardened surface from a portion of an end of the base material in an axial direction; processing, into an externally threaded portion, the portion of the base material from which the hardened surface is removed by the removing.

According to the method, while the shaft portion and externally threaded portion of the power transmission pin for a speed changer are formed from the single base material, at least the surface of the shaft portion can accomplish higher hardness than the externally threaded portion in a simplified manner.

The method may further include a step of, prior to the hardening, quenching and tempering the base material.

A yet another aspect of the present disclosure provides a method of manufacturing a power transmission pin for a speed changer, the power transmission pin being used in a speed changer and configured to transmit power, the speed changer including a speed changing mechanism configured to receive rotation input thereto, change a speed of the input rotation and output the speed-changed rotation. The method includes steps of: processing a portion of an end of a rod-shaped base material in an axial direction into an externally threaded portion; and subsequent to the processing, hardening a surface of the base material excluding the externally threaded portion.

According to the method, while the shaft portion and externally threaded portion of the power transmission pin for a speed changer are formed from the single base material, at least the surface of the shaft portion can accomplish higher hardness than the externally threaded portion in a simplified manner.

In the implementation, the hardening may include nitriding the surface of the base material into a nitride layer.

The above-described power transmission pin for a speed changer, speed changer and method of manufacturing a power transmission pin for a speed changer achieve improved strength, toughness and wear resistance.

DESCRIPTION OF THE PREFERRED EMBODIMENTS

Figure 1:
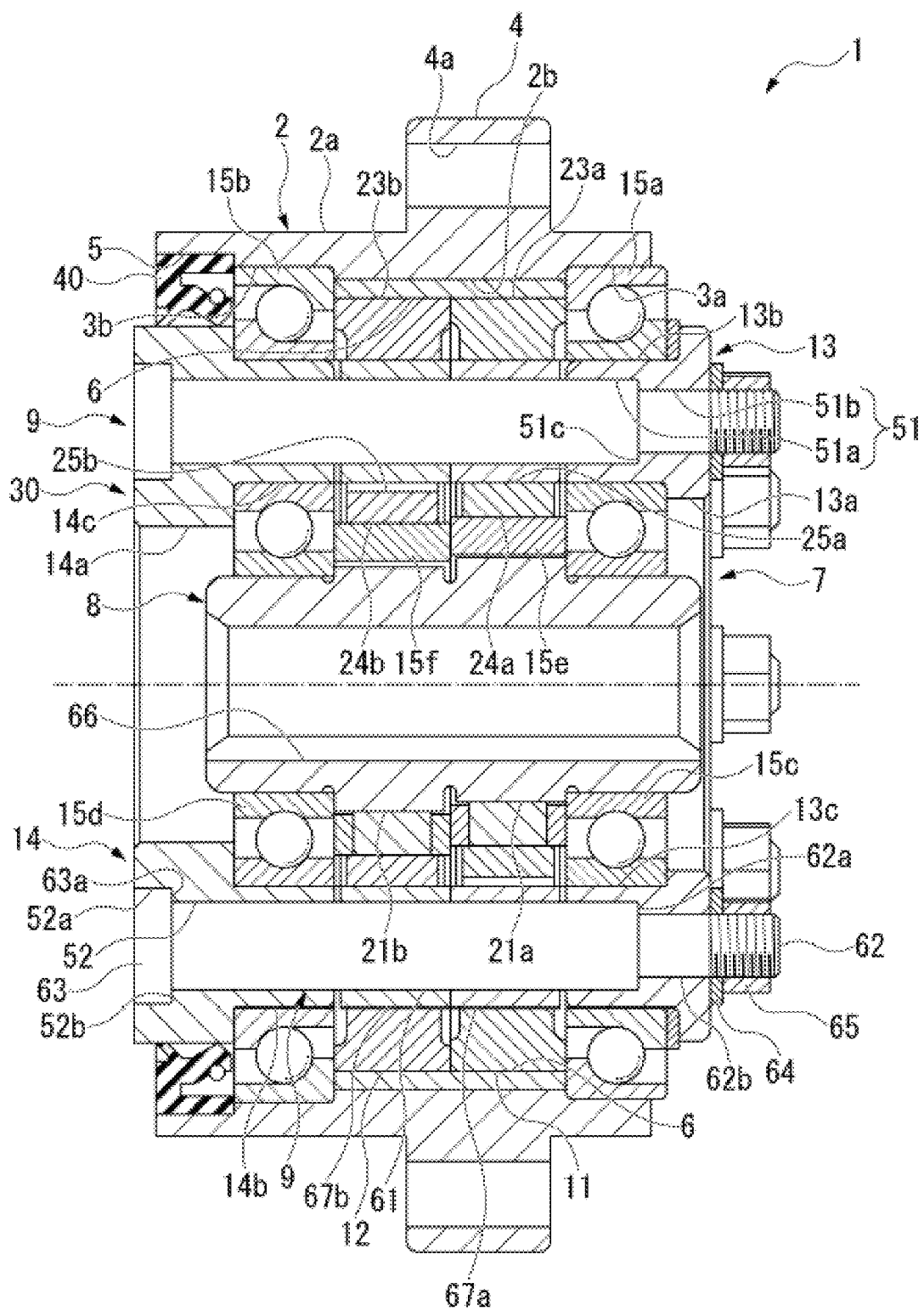
FIG. 1 is a sectional view showing a speed reducer according to an embodiment of the present disclosure.

The embodiments of the present disclosure will be hereinafter described with reference to the drawings.
<Speed Reducer>
FIG. 1 is a sectional view of a speed reducer 1. The speed reducer 1 is an eccentric oscillation speed reducer. The speed reducer 1 includes a circular-cylindrical case 2, and a carrier 7 rotatably supported on the case 2 via two bearings 15a and 15b (a first bearing 15a and a second bearing 15b). In the following description, the terms "axial direction," "axially" and "axial" refer to the axial direction of the case 2. Similarly, the terms "circumferential direction," "circumferentially" and "circumferential" refer to the circumferential direction of the case 2. Similarly, the terms "radial direction," "radially" and "radial" refer to the radial direction of the case 2.
<Case>
The case 2 is made of, for example, an iron-based material such as cast iron. Alternatively, the case 2 may be made of, for example, an aluminum alloy, a magnesium alloy, carbon fiber reinforced plastic (CFRP), or a resin containing boron nitride for improved thermal conductivity. An outer flange portion 4 projecting outward in the radial direction is integrally formed with the outer circumferential surface 2a of the case 2. The outer flange portion 4 has a rectangular section when cut along the axial direction. The outer flange portion 4 has a plurality of bolt holes 4a penetrating therethrough in the axial direction and arranged at equal intervals in the circumferential direction. A device (not shown), to which the speed reducer 1 is attached, is overlaid on the outer flange portion 4. Bolts (not shown) are inserted into the bolt holes 4a of the outer flange portion 4 and tightened into the device. In this way, the speed reducer 1 can be secured onto the device.

The inner circumferential surface 2b of the case 2 has, at the opposite ends in the axial direction, bearing housings 3a and 3b (a first bearing housing 3a and a second bearing housing 3b). The bearing housings 3a and 3b have, via a step, a greater inner diameter than the inner circumferential surface 2b of the case 2. The first bearing 15a is fitted into the first bearing housing 3a. The second bearing 15b is fitted into the second bearing housing 3b. The first and second bearings 15a and 15b are, for example, ball bearings.

The portion of the inner circumferential surface 2b of the case 2 that is positioned on the axially outer side of the second bearing housing 3b forms a seal housing 5. The seal housing 5 has, via a step, a greater inner diameter than the second bearing housing 3b. The seal housing 5 fittedly receives a seal 40. The seal 40 provides sealing between the case 2 and the carrier 7.

The portion of the inner circumferential surface 2b of the case 2 that is positioned between the two bearing housings 3a and 3b has a plurality of internal tooth pins 6. Each of the internal tooth pins 6 is shaped like a circular column extending in the axial direction. The present embodiment is, however, not limited to such, and the internal tooth pins 6 may be hollow members. The internal tooth pins 6 are arranged at regular intervals in the circumferential direction. The internal tooth pins 6 constitute part of a speed reducing mechanism 30. Specifically, the internal tooth pins 6 serve as internal teeth meshing with oscillating gears 11 band 12, which will be described below.
<Speed Reducing Mechanism>
The speed reducing mechanism 30 includes: the carrier 7; power transmission pins 9 provided in the carrier 7; a crankshaft 8 rotatably supported by the carrier 7 via two bearings 15c and 15d (a third bearing 15c and a fourth bearing 15d); and two oscillating gears 11 and 12 (a first oscillating gear 11 and a second oscillating gear 12) rotatably supported by the crankshaft 8. The axis of rotation of the carrier 7 coincides with the axis of rotation of the crankshaft 8. These axes of rotation coincide with the central axis of the case 2.

The carrier 7 is constituted by a first flange 13 and a second flange 14 facing each other in the axial direction and shaped like a disk. The first and second flanges 13 and 14 are made of, for example, an iron-based material such as cast iron.

From among the two flanges 13 and 14, the second flange 14 is arranged at the same side as the seal housing 5 of the case 2. The first flange 13 has a first opening 13a extending through the first flange 13 in the axial direction. The first opening 13a occupies a large part of the radially central portion of the first flange 13. The portion of the outer circumferential surface of the first flange 13 that faces the second flange 14 constitutes a first diameter-reduced portion 13b. The first diameter-reduced portion 13b has, via a step, a smaller outer diameter than the first flange 13. The first bearing 15a is fitted onto the first diameter-reduced portion 13b.

The portion of the inner circumferential surface of the first opening 13a that faces the second flange 14 constitutes a first diameter-increased portion 13c. The first diameter-increased portion 13c has, via a step, a greater inner diameter than the first opening 13a. The third bearing 15c is fitted onto the first diameter-increased portion 13c. The third bearing 15c is, for example, a ball bearing.

The first flange 13 has a plurality of first bolt insertion holes 51. The first bolt insertion holes 51 are arranged at equal intervals in the circumferential direction. Each of the first bolt insertion holes 51 is divided into a shaft insertion portion 51a facing the second flange 14, and a threaded insertion portion 51b facing away from the second flange 14. The shaft insertion portion 51a and threaded insertion portion 51b are coaxially arranged. The shaft insertion portion 51a and threaded insertion portion 51b are in communication with each other. The threaded insertion portion 51b has, via a step 51c, a smaller inner diameter than the shaft insertion portion 51a.

The outer circumferential surface of the second flange 14 has a portion that faces the seal housing 5 of the case 2 in the radial direction. A seal 40 is fitted onto this portion of the outer circumferential surface of the second flange 14. This can provide sealing between the case 2 and the second flange 14 that constitutes a part of the carrier 7. The second flange 14 has a second opening 14a extending through the second flange 14 in the axial direction. The second opening 14a occupies a large part of the radially central portion of the second flange 14. The portion of the outer circumferential surface of the second flange 14 that faces the first flange 13 constitutes a second diameter-reduced portion 14b. The second diameter-reduced portion 14b has, via a step, a smaller outer diameter than the second flange 14. The second bearing 15b is fitted onto the second diameter-reduced portion 14b.

The portion of the inner circumferential surface of the second opening 14a that faces the first flange 13 constitutes a second diameter-increased portion 14c. The second diameter-increased portion 14c has, via a step, a greater inner diameter than the second opening 14a. The fourth bearing 15d is fitted onto the second diameter-increased portion 14c. The fourth bearing 15d is, for example, a ball bearing.

The second flange 14 has a plurality of second bolt insertion holes 52. The second bolt insertion holes 52 are arranged at equal intervals in the circumferential direction. The first and second bolt insertion holes 51 and 52 are coaxially arranged. The inner diameter of the second bolt insertion holes 52 is equal to that of the shaft insertion portions 51a of the first bolt insertion holes 51. Each of the second bolt insertion holes 52 has a counterboring portion 52a on the side facing away from the first flange 13. The counterboring portion 52a has, via a step 52b, a greater inner diameter than the second bolt insertion hole 52.

The power transmission pins 9 are respectively inserted through the bolt insertion holes 51 and 52 of the flanges 13 and 14. The power transmission pins 9 are formed of, for example, aluminum chromium molybdenum steels. Each of the power transmission pins 9 includes: a shaft portion 61 shaped like a circular column; an externally threaded portion 62 integrally formed at one end of the shaft portion 61 in the axial direction; and a head 63 integrally formed at the other end of the shaft portion 61 in the axial direction. The shaft portion 61, externally threaded portion 62 and head 63 are coaxially arranged.

The outer diameter of the shaft portion 61 is equal to or slightly less than the inner diameter of the shaft insertion portion 51a of the first bolt insertion hole 51, or the inner diameter of the second bolt insertion hole 52. The externally threaded portion 62 has, via a step 62a, a smaller outer diameter than the shaft portion 61. The base of the externally threaded portion 62, which faces the shaft portion 61, has a semi-threaded portion 62b. The head 63 has, via a step 63a, a greater outer diameter than the shaft portion 61. The outer diameter of the head 63 is slightly smaller than the outer diameter of the counterboring portion 52a of the second flange 14.

The above-described power transmission pins 9 are inserted from the second flange 14 side with the externally threaded portions 62 pointing toward the first flange 13, first through the second bolt insertion holes 52 and then through the first bolt insertion holes 51. The heads 63 of the power transmission pins 9 are inserted into the counterboring portions 52a of the second bolt insertion holes 52. Since the steps 63a of the power transmission pins 9 butt up against the steps 52b of the second bolt insertion holes 52, the power transmission pins 9 can be rightly positioned in the axial direction with respect to the second flange 14.

On the other hand, the externally threaded portions 62 of the power transmission pins 9 protrude outside beyond the first bolt insertion holes 51 in the axial direction. The semi-threaded portions 62b of the externally threaded portions 62 are inserted into the threaded insertion portions 51b of the first bolt insertion holes 51. The ends of the shaft portions 61 that face the externally threaded portions 62 are inserted into the shaft insertion portions 51a of the first bolt insertion holes 51. Since the steps 62a of the power transmission pins 9 butt up against the steps 51c of the first bolt insertion holes 51, the power transmission pins 9 can be rightly positioned in the axial direction with respect to the first flange 13.

The externally threaded portions 62 that protrude outside beyond the first bolt insertion holes 51 in the axial direction receive plain washers 64. Nuts 65 are placed above the plain washers 64 and tightened. In the above-described manner, the power transmission pins 9 are secured into the carrier 7 (first and second flanges 13 and 14). How to manufacture the power transmission pins 9 will be described below in detail. With the power transmission pins 9 being secured, two bushings 67a and 67b (a first bushing 67a and a second bushing 67b) are fitted onto the shaft portion 61 of each power transmission pin 9 between the first and second flanges 13 and 14. The bushings 67a and 67b are made of, for example, high carbon chromium bearing steels such as SUJ2.

While being inserted through the first and second openings 13a and 14a, the crankshaft 8 is rotatably supported by the flanges 13 and 14 via the third and fourth bearings 15c and 15d. Like the power transmission pins 9, the crankshaft 8 is made of, for example, an aluminum alloy. Like the power transmission pins 9, the crankshaft 8 may be made of other possible source materials such as stainless steels or various ferrous metals.

The crankshaft 8 is hollow. The inner circumferential surface of the crankshaft 8 has a key groove 66. The key groove 66 is used to couple the crankshaft 8 with a motor shaft of an electric motor that may be provided on a device, which is not shown. The crankshaft 8 has a first eccentric portion 21a and a second eccentric portion 21b arranged in the axial direction between the third and fourth bearings 15c and 15d.

The first eccentric portion 21a is closer to the first flange 13. The second eccentric portion 21b is closer to the second flange 14. The axes of the eccentric portions 21a and 21b are shifted from the axis of rotation of the crankshaft 8 (carrier 7). The eccentric portions 21a and 21b are out of phase with each other. For example, the eccentric portions 21a and 21b are out of phase with each other by 180°.

The eccentric portions 21a and 21b are respectively provided with bearings 15e and 15f (a fifth bearing 15e and a sixth bearing 15f). The fifth and sixth bearings 15e and 15f are, for example, needle bearings. The eccentric portions 21a and 21b rotatably support the oscillating gears 11 and 12 (first oscillating gear 11 and second oscillating gear 12) via the bearings 15e and 15f, respectively. In other words, the oscillating gears 11 and 12 are disposed between the first and second flanges 13 and 14.

The two oscillating gears 11 and 12 are made of, for example, an iron-based material such as chrome molybdenum steel.

The two oscillating gears 11 and 12 respectively have crankshaft insertion holes 24a and 24b (a first crankshaft insertion hole 24a, a second crankshaft insertion hole 24b) at their center in the radial direction. The crankshaft insertion holes 24a and 24b extend through the oscillating gears 11 and 12 in the thickness direction. The crankshaft insertion holes 24a and 24b fittingly receive the bearings 15e and 15f, respectively. External teeth 23a and 23b that mesh with the internal tooth pins 6 provided on the case 2 are formed on the outer peripheral portions of the two oscillating gears 11 and 12, respectively. The number of external teeth 23a and 23b is smaller than that of the internal tooth pins 6 by, for example, one.

The two oscillating gears 11 and 12 have pin insertion holes 25a and 25b (first pin insertion holes 25a and second pin insertion holes 25b) that are aligned with the power transmission pins 9. The shaft portions 61 of the power transmission pins 9 pass through the pin insertion holes 25a and 25b. The first bushings 67a fitted on the shaft portions 61 pass through the first pin insertion holes 25a. The second bushings 67b fitted on the shaft portions 61 pass through the second pin insertion holes 25b.

As configured in the above-described manner, the eccentric portions 21a and 21b of the crankshaft 8 can cause the oscillating gears 11 and 12 to oscillatorily rotate. The inner diameters of the pin insertion holes 25a and 25b of the oscillating gears 11 and 12 are large enough to allow the oscillatory rotation of the oscillating gears 11 and 12 with the shaft portions 61 of the power transmission pins 9 and bushings 67a and 67b being inserted in the pin insertion holes 25a and 25b.

<How Speed Reducer Works>

The following now describes how the speed reducer 1 works. Upon rotation of the crankshaft 8, which is caused by a not-shown electric motor, the oscillating gears 11 and 12 rotatably supported by the eccentric portions 21a and 21b may oscillatorily rotate. This causes some of the external teeth 23a and 23b of the oscillating gears 11 and 12 to mesh with the internal tooth pins 6 of the case 2. Since the number of external teeth 23a and 23b is less than that of the internal tooth pins 6 by, for example, one, the meshing positions of the external teeth 23a and 23b with the internal tooth pins 6 (case 2) move sequentially in the circumferential direction while the oscillating gears 11 and 12 rotate on their own axis. The rotation of the oscillating gears 11 and 12 on their own axis is at a lower speed than the rotation of the crankshaft 8.

The power transmission pins 9 pass through the pin insertion holes 25a and 25b of the oscillating gears 11 and 12. Upon rotation of the oscillating gears 11 and 12 on their own axis, the rotational force produced by the oscillating gears 11 and 12 in the rotational direction is transmitted to the power transmission pins 9 via the bushings 67a and 67b. The power transmission pins 9 are fixedly attached onto the carrier 7 (first and second flanges 13 and 14). Thus, the rotational force produced by the oscillating gears 11 and 12 is transmitted to the carrier 7.

The carrier 7 is rotatably supported by the case 2 via the first and second bearings 15a and 15b. Thus, the carrier 7 can rotate relative to the case 2. Therefore, the rotation is input into the crankshaft 8, reduced and then output through the carrier 7. The power transmission pins 9 are highly loaded because they are configured to transmit to the carrier 7 the rotation of the oscillating gears 11 and 12, which results from reducing the rotation of the crankshaft 8. The power transmission pins 9 are thus manufactured in the following manner.

<How to Manufacture Power Transmission Pins>

Figure 2:
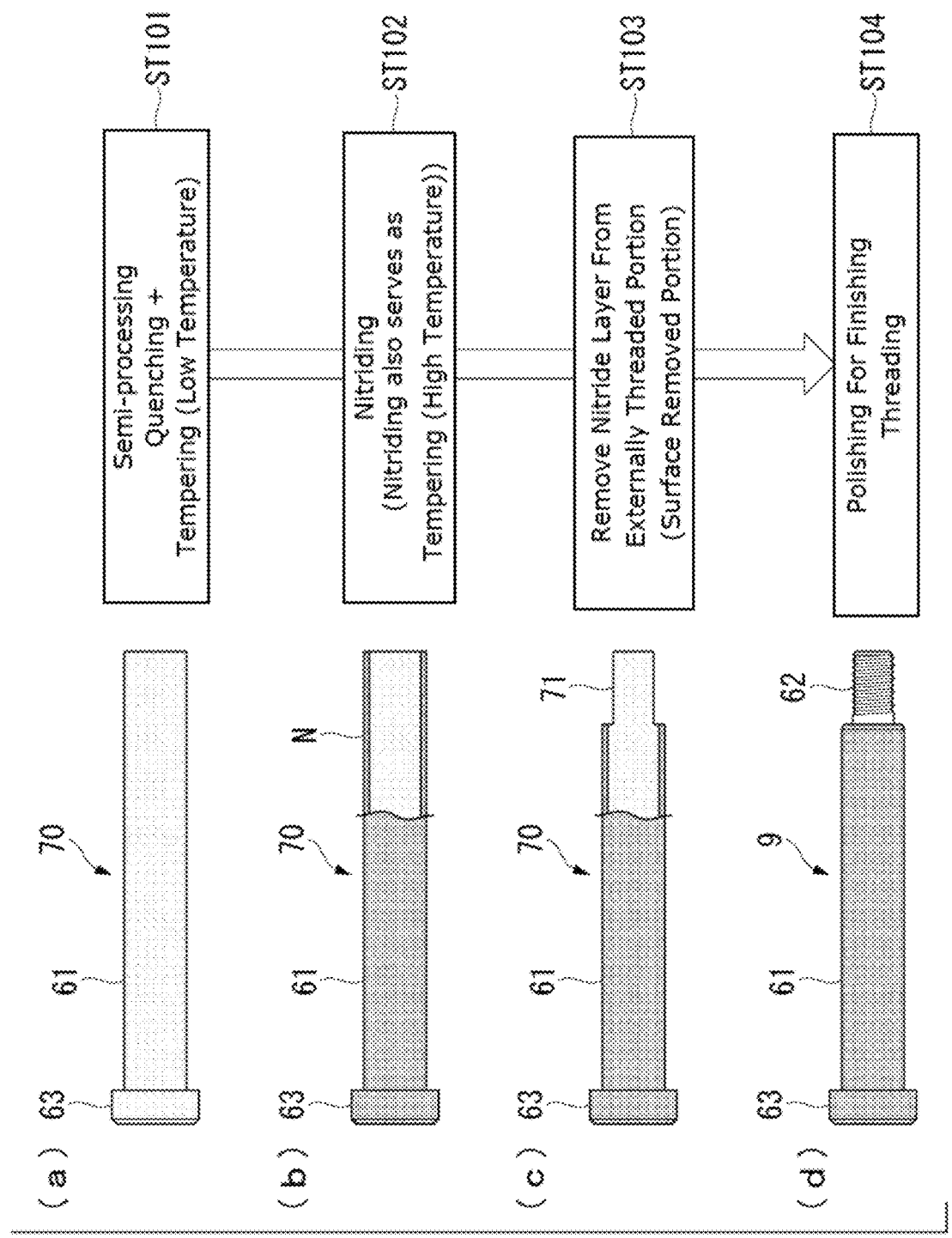
FIG. 2 shows steps (a) to (d) of a method of manufacturing a power transmission pin relating to an embodiment of the present disclosure.

FIG. 2 shows the steps (a) to (d) of the method of manufacturing each of the power transmission pins 9. The views (a) to (c) of FIG. 2 are side views of a base material 70 of the power transmission pin 9. The views (b) and (c) of FIG. 2 are cutaway drawings showing the base material 70. As shown in the view (a) of FIG. 2, the base material 70 of the power transmission pin 9 is quenched and tempered (step ST101: semi-processing step). Here, a portion of the base material 70 that is to be processed into the externally threaded portion 62 of the power transmission pin 9 has not been processed yet and thus has the same diameter as the shaft portion 61. The base material 70 has, on the other hand, the head 63 of the power transmission pin 9. The base material 70 is not thermally processed yet.

From among the quenching and tempering, the quenching is performed at the temperature of 860° C. and for the duration of approximately one hour, for example. The tempering is performed at a relatively low temperature. Specifically, the tempering is performed at the temperature of 160° C. and for the duration of approximately two hours, for example. The quenching and tempering can lead to improved toughness (capability to withstand stress and strain) of the base material 70. At the completion of these steps, the base material 70 has approximately Rockwell hardness [HRC] of 37 to 45, for example.

Subsequently, as shown in the view (b) of FIG. 2, the surface of the base material 70 is hardened (step ST102: surface hardening step). Specifically, the surface of the base material 70 is nitrided to form a nitride layer N. The nitriding step is performed at the temperature of 520° C. and for the duration of approximately thirty-five hours, for example. The nitride layer N has a thickness of approximately 0.2 mm, for example. The nitride layer N has Vickers hardness [HV] of approximately 1000 to 750, for example. At the completion of the surface hardening step, the surface of the base material 70, namely, the nitride layer N has hardness at a different level than the internal portion (core portion) of the base material 70. The above-mentioned level of hardness of the nitride layer N is higher than the level of hardness of the bushings 67a and 67b.

Subsequently, as shown in the view (c) of FIG. 2, the nitride layer N of the portion that is to be processed into the externally threaded portion 62 is removed (step ST103: surface removing step). In the following description, a surface removed portion 71 refers to the portion in which the nitride layer N has been removed. Since the nitride layer N has been removed from the surface of the surface removed portion 71, the surface of the surface removed portion 71 has Rockwell hardness [HRC] of approximately 37 to 45, for example. For the removing performed to form the surface removed portion 71, the amount of removing is set at approximately 0.5 mm, for example. Since the nitride layer N has a thickness of approximately 0.2 mm, the surface removing step can sufficiently remove the nitride layer N.

The amount of removing for the surface removing step may be set such that the step can not entirely remove the nitride layer N. For example, the amount of removing may be set to approximately 0.1 mm. In this case, it is only the nitride layer N that can be removed. This may make the surface removing step difficult as it is only the high hardness layer that can be removed. The surface removing step can be made easy since the amount of removing for the surface removing step is large enough to remove not only the nitride layer N but also a slight portion of the internal layer.

Subsequently, as shown in the view (d) of FIG. 2, the surface removed portion 71 is processed into the externally threaded portion 62 (step ST104: threading step). In addition, the shaft portion 61 is polished for finishing. Thus, the manufacturing of the power transmission pin 9 is completed. As described above, the surface removed portion 71 is processed into the externally threaded portion 62. On the other hand, the shaft portion 61 has the nitride layer N as the surface. This means that the hardness of the surface of the shaft portion 61 is higher than that of the externally threaded portion 62. Furthermore, the hardness of the surface of the shaft portion 61 is higher than that of the bushings 67a and 67b.

In the above-described power transmission pin 9, the hardness of the surface of the shaft portion 61 is higher than that of the externally threaded portion 62. The power transmission pin 9 can thus achieve improved strength, toughness and anti-wear resistance. The anti-wear resistance, strength and toughness of the power transmission pin 9 may be enhanced simply by raising the hardness of the entire power transmission pin 9. This attempt, however, may result in damaging the externally threaded portion 62 of the power transmission pin 9. To address this issue, the present embodiment proposes the above-described power transmission pin 9, where the hardness of the surface of the shaft portion 61 is higher than that of the externally threaded portion 62. In this way, the externally threaded portion 62 is less likely to be damaged while the shaft portion 61, which may receive the highest load, can have sufficient strength. The externally threaded portion 62 also has improved toughness due to the quenching and tempering. The power transmission pin 9 can thus achieve improved strength, toughness and anti-wear resistance.

To increase the hardness of the surface of the shaft portion 61, the surface of the shaft portion 61 is nitrided to form the nitride layer N. The shaft portion 61 can thus reliably have a highly hard surface. The hardness of the surface of the shaft portion 61 is higher than that of the bushings 67a and 67b. The anti-wear resistance of the shaft portion 61 against the bushings 67a and 67b can be thus certainly improved. The speed reducer 1 can thus achieve improved strength, toughness and anti-wear resistance.

A method of manufacturing the power transmission pin 9 includes: a surface hardening step of hardening the surface of the base material 70, a surface removing step performed subsequently to the surface hardening step; and a threading step of processing the surface removed portion 71 produced by the surface removing step into the externally threaded portion 62. While the shaft portion 61 and externally threaded portion 62 are formed from the single base material 70, the surface of the shaft portion 61 can accomplish a higher hardness than the externally threaded portion 62 in a simplified manner. As an alternative example, after the power transmission pin 90 has the final shape, the nitriding step may be possibly performed while the externally threaded portion 62 of the power transmission pin 9 is prevented from getting nitrided. This is, however, burdensome. In comparison to this alternative method, the above-described manufacturing method can efficiently manufacture the power transmission pin 9.

In addition, prior to the surface hardening step, the base material 70 is subject to quenching and tempering. This can impart desired strength and toughness to the externally threaded portion 62. Since the base material 70 is quenched and tempered in advance, the subsequent surface hardening step can be completed within a shorter period of time. This is because the surface hardening step is also tempering treatment performed at a high temperature. Since the previously performed quenching and tempering treatment serves as low-temperature tempering treatment, the duration of the surface hardening step can be shortened.

According to the above-described manufacturing method, the base material 70 goes through the surface hardening step, surface removing step and threading step in the stated order in order to allow the surface of the shaft portion 61 to have higher hardness than the externally threaded portion 62. The present embodiment, however, is not limited to such. The manufacturing method can be modified in any manner as long as the surface of the shaft portion 61 can have higher hardness than the externally threaded portion 62 in the finished product or the power transmission pin 9.

For example, the surface of the shaft portion 61 can be hardened by forming a diamond like carbon (DLC) coating on the surface of the shaft portion 61 instead of the nitriding treatment. In this alternative case, the method of manufacturing the power transmission pin 9 starts with a step of processing the base material 70 to have the externally threaded portion 62 (the threading step). After this, the surface of the portion of the base material 70 that excludes the externally threaded portion 62 (the surface of the shaft portion 61) is hardened (the surface hardening step). If the surface of the shaft portion 61 is hardened by forming a DLC coating, the hardening step is performed after masking the externally threaded portion 62. This alternative method can also produce the same advantageous effects as the above-described embodiment.

According to the above-described embodiment, the power transmission pins 9 are formed of, for example, aluminum chromium molybdenum steels. The present embodiment, however, can be modified as long as the hardness of the surface of the shaft portion 61 is higher than that of the externally threaded portion 62. The power transmission pins 9 may be formed of any other materials than aluminum chromium molybdenum steels. For example, the power transmission pins 9 may be made of steel materials such as chrome molybdenum steels. In this case, the surface of the shaft portion 61 can achieve higher hardness than the externally threaded portion 62 by performing high-frequency quenching on the surface of the shaft portion 61. In this case, the manufacturing method is performed in the same manner as in the foregoing case of forming a DLC coating.

According to the above-described embodiment, the hardness of the surface of the shaft portion 61 is higher than that of the externally threaded portion 62 in each power transmission pin 9. Specifically, the nitride layer N has hardness at a different level than the internal portion (core portion) in the shaft portion 61. The present embodiment, however, can be modified in any manner as long as at least the surface of the shaft portion 61 has higher hardness than the externally threaded portion 62. The internal portion of the shaft portion 61 may have hardness of the same level as the surface.

The embodiments described herein are not intended to necessarily limit the present disclosure to any specific embodiments. Various modifications can be made to these embodiments without departing from the true scope and spirit of the present disclosure.

For example, the above-described embodiment is directed to the speed reducer 1 including the speed reducing mechanism 30 configured to reduce the rotation of the crankshaft 8 and output the reduced rotation. The embodiment is, however, not limited to such, and the above-described power transmission pins 9 may be applied to speed increasers in place of the speed reducing mechanism 30. Alternatively, the power transmission pins 9 may be applied to rotating mechanisms including rotators instead of the speed reducing mechanism 30 (carrier 7 and oscillating gears 11 and 12). The power transmission pins 9 can be applied to any rotating mechanisms as long as their rotators have pin insertion holes (pin insertion holes 25a and 25b) through which the power transmission pins 9 can be inserted.

In the embodiments disclosed herein, a member formed of multiple components may be integrated into a single component, or conversely, a member formed of a single component may be divided into multiple components. As long as it is configured such that the purpose of the invention can be achieved, such components may be integrated or separately provided.

The present disclosure further includes the following aspects.

<1>

A rotating mechanism comprising:
a rotator having an insertion hole;
a tubular bushing in the insertion hole; and
a power transmission pin inserted through the bushing,
wherein the power transmission pin includes:
  a shaft portion; and
  an externally threaded portion connecting the rotator and the power transmission pin into a single piece, the externally threaded portion being formed on an end of the shaft portion in an axial direction, the externally threaded portion and the shaft portion being coaxially arranged,
wherein at least a surface of the shaft portion has higher hardness than the externally threaded portion and than the bushing.

<2>

The rotating mechanism of <1>, wherein the surface of the shaft portion is nitrided into a nitride layer.

What is claimed is:

1. A power transmission pin for a speed changer, the power transmission pin being used in a speed changer and configured to transmit power, the speed changer including a speed changing mechanism configured to receive rotation input thereto, change a speed of the rotation, and output the speed-changed rotation, the power transmission pin comprising:
a shaft portion; and
an externally threaded portion configured to fixedly attach the shaft portion onto the speed changing mechanism, the externally threaded portion being formed on an end of the shaft portion in an axial direction, the externally threaded portion and the shaft portion being coaxially arranged,
wherein at least a surface of the shaft portion has higher hardness than the externally threaded portion.

2. The power transmission pin of claim 1, wherein the surface of the shaft portion is nitrided into a nitride layer.

3. A speed changer comprising:
an input part configured to rotate;
a speed changing mechanism configured to change a speed of rotation of the input part; and
an output part configured to receive the rotation of the input part transmitted via the speed changing mechanism,
wherein the speed changing mechanism includes:
a gear having a pin insertion hole;
a power transmission pin inserted through the pin insertion hole; and
a tubular bushing inserted through the pin insertion hole and fitted onto the power transmission pin,
wherein the power transmission pin includes:
  a shaft portion; and
  an externally threaded portion connecting the gear and the power transmission pin into a single piece, the externally threaded portion being formed on an end of the shaft portion in an axial direction, the externally threaded portion and the shaft portion being coaxially arranged,
wherein at least a surface of the shaft portion has higher hardness than the externally threaded portion and than the bushing.

4. The speed changer of claim 3, wherein the surface of the shaft portion is nitrided into a nitride layer.

5. A method of manufacturing a power transmission pin for a speed changer, the power transmission pin being used in a speed changer and configured to transmit power, the speed changer including a speed changing mechanism configured to receive rotation input thereto, change a speed of the input rotation and output the speed-changed rotation, the method comprising steps of:
hardening a surface of a rod-shaped base material;
subsequent to the hardening, removing the hardened surface from a portion of an end of the base material in an axial direction;
processing, into an externally threaded portion, the portion of the base material from which the hardened surface is removed by the removing.

6. The method of claim 5, further comprising a step of prior to the hardening, quenching and tempering the base material.

7. The method of claim 6, wherein the hardening includes nitriding the surface of the base material into a nitride layer.

8. The method of claim 5, wherein the hardening includes nitriding the surface of the base material into a nitride layer.

9. A method of manufacturing a power transmission pin for a speed changer, the power transmission pin being used in a speed changer and configured to transmit power, the speed changer including a speed changing mechanism configured to receive rotation input thereto, change a speed of the input rotation and output the speed-changed rotation, the method comprising steps of:
- processing a portion of an end of a rod-shaped base material in an axial direction into an externally threaded portion; and
- subsequent to the processing, hardening a surface of the base material excluding the externally threaded portion.

10. The method of claim 9, wherein the hardening includes nitriding the surface of the base material into a nitride layer.

\* \* \* \* \*